(12) United States Patent
Qu

(10) Patent No.: US 11,872,947 B1
(45) Date of Patent: Jan. 16, 2024

(54) ANTI-THEFT LICENSE PLATE HOLDER

(71) Applicant: Dezheng Qu, Shenzhen (CN)

(72) Inventor: Dezheng Qu, Shenzhen (CN)

( * ) Notice: Subject to any disclaimer, the term of this patent is extended or adjusted under 35 U.S.C. 154(b) by 0 days.

(21) Appl. No.: 18/229,527

(22) Filed: Aug. 2, 2023

(51) Int. Cl.
*B60R 13/10* (2006.01)

(52) U.S. Cl.
CPC .................................. *B60R 13/105* (2013.01)

(58) Field of Classification Search
CPC ....... B60R 13/10; B60R 13/105; B60R 19/50; G09F 2007/1843; G09F 2007/1865; G09F 2007/1895; G09F 7/18; B60Q 1/56; E05B 73/00
USPC .......... D12/193; 248/551, 552, 553; 40/200, 40/201, 202, 203; 70/258; 293/117
See application file for complete search history.

(56) References Cited

U.S. PATENT DOCUMENTS

| | | | | |
|---|---|---|---|---|
| 1,701,419 A | * | 2/1929 | Peden | B60R 13/105 248/316.5 |
| 1,950,205 A | * | 3/1934 | Young | B60R 13/105 40/203 |
| 1,975,796 A | * | 10/1934 | Miller | B60R 13/105 40/202 |
| 2,098,432 A | * | 11/1937 | Roose | B60R 13/105 40/209 |
| 4,918,792 A | * | 4/1990 | Engels | B60R 13/105 248/316.1 |
| 5,813,640 A | * | 9/1998 | Koch | B60R 13/105 40/200 |
| D413,174 S | * | 8/1999 | Mayer | D26/28 |
| 7,740,295 B2 | * | 6/2010 | Rein | B60R 9/06 293/142 |
| 7,918,427 B2 | * | 4/2011 | Wang | G06F 1/20 248/278.1 |
| D709,816 S | * | 7/2014 | Rohaly | D12/223 |
| 9,221,406 B2 | * | 12/2015 | Angara | B60R 13/105 |
| 9,664,214 B1 | * | 5/2017 | Gupta | G03B 17/561 |
| 10,414,349 B2 | * | 9/2019 | Diaz | B62J 50/26 |
| 10,518,721 B1 | * | 12/2019 | Nowakowski | G09F 7/18 |
| D890,663 S | * | 7/2020 | Nowakowski | D12/193 |
| 10,823,329 B1 | * | 11/2020 | Dammermann | F16B 2/10 |
| D906,915 S | * | 1/2021 | Pham | D12/193 |
| 10,933,820 B1 | * | 3/2021 | Budraitis | B60R 13/105 |

(Continued)

FOREIGN PATENT DOCUMENTS

| | | | | |
|---|---|---|---|---|
| CN | 104269097 A | * | 1/2015 | ............. G09B 25/00 |
| CN | 105235611 A | * | 1/2016 | ........... B60R 13/105 |

(Continued)

*Primary Examiner* — Jonathan Liu
*Assistant Examiner* — Guang H Guan
(74) *Attorney, Agent, or Firm* — PETE ADAMS LAW, PLLC

(57) ABSTRACT

A device for securing a display to a vehicle grill and a method for securing the display to prevent theft are disclosed. The device includes a display holder that can hold license plates or other visual displays. The display holder includes a set of lower levers with hooks configured to engage a first portion of the vehicle grill. The display holder includes a set of upper levers with hooks configured to engage a second portion of the vehicle grill. The device includes a locking mechanism with a lock and a ratchet gear. The lock is attached to a front plate of a linear motion module. The locking mechanism includes a cam which is secured onto an end of the lock. The cam and the lock rotate together when a fitted key is turned.

11 Claims, 14 Drawing Sheets

(56) References Cited

U.S. PATENT DOCUMENTS

| | | | | |
|---|---|---|---|---|
| 11,472,351 | B2 * | 10/2022 | Pham | B60R 13/105 |
| D975,611 | S * | 1/2023 | Shen | D12/193 |
| D983,714 | S * | 4/2023 | Yang | D12/193 |
| 11,780,385 | B1 * | 10/2023 | Qu | B60R 13/105 |
| | | | | 40/209 |

FOREIGN PATENT DOCUMENTS

| | | | | |
|---|---|---|---|---|
| DE | 202009008319 U1 * | 1/2010 | | B60R 13/105 |
| DE | 202010007417 U1 * | 9/2010 | | B60R 13/105 |

* cited by examiner

ANTI-THEFT LICENSE PLATE HOLDER

CROSS-REFERENCE TO RELATED APPLICATIONS

This is a U.S. Nonprovisional Patent Application filed under 35 U.S.C. 111(a).

BACKGROUND OF THE INVENTION

1. Field of the Invention

The present invention relates generally to license plate holders for vehicles, such as automobiles and trucks, and more particularly to a grill mounted front license plate holder with theft prevention technology.

2. Description of Related Art

Many vehicles are not equipped with license plate mounts on the front of the vehicle. In some states, however, it is required by law to have license plates displayed on both the rear as well as the front of the vehicle. It is common for license plate mounting systems to be attached to the front of vehicles by drilling holes in the bumper or other suitable portion of the body of the vehicle and fastening the mounting system through the holes.

Vehicle owners often do not want to drill holes into the bumper or other portion of the body of their automobiles. Vehicle owners also want a secure license plate holder that cannot be easily removed by thieves. Therefore, there is a need for a front license plate holder that allows a license plate to be secured to the body of a vehicle without creating holes or damaging the body of the vehicle. There is a further need for a license plate device that can be attached to the front grill of vehicles. There is also a need for a license plate holder that can be secured to a vehicle with theft prevention technology.

SUMMARY OF THE INVENTION

A device for securing a display to a vehicle grill and a method for securing the display are disclosed herein. The device includes a display holder that can hold license plates or other visual displays. The display holder includes a set of lower levers with hooks configured to engage a first portion of a vehicle grill. The display holder includes a set of upper levers with hooks configured to engage a second portion of a vehicle grill. The device includes a locking mechanism with a lock and ratchet gear. The lock is attached to a front plate of a linear motion module. The locking mechanism includes a cam which is secured onto the end of the lock. The cam and lock rotate together when a fitted key is turned. The ratchet gear is attached to the end of the threaded screw and rotates together with the screw.

DETAILED DESCRIPTION OF THE INVENTION

The following descriptions relate principally to preferred embodiments while a few alternative embodiments may also be referenced on occasion, although it should be understood that many other alternative embodiments would also fall within the scope of the invention. The embodiments disclosed are not to be construed as describing limits to the invention, whereas the broader scope of the invention should instead be considered with reference to the claims, which may be now appended or may later be added or amended in this or related applications. Unless indicated otherwise, it is to be understood that terms used in these descriptions generally have the same meanings as those that would be understood by persons of ordinary skill in the art. It should also be understood that terms used are generally intended to have the ordinary meanings that would be understood within the context of the related art, and they generally should not be restricted to formal or ideal definitions, unless and only to the extent that a particular context clearly requires otherwise. Synonymous or equivalent terms may be used in different instances in the specification and should not be construed to limit the invention.

For purposes of these descriptions, a few wording simplifications should also be understood as universal, except to the extent otherwise clarified in a particular context either in the specification or in particular claims. The use of the term "or" should be understood as referring to alternatives, although it is generally used to mean "and/or" unless explicitly indicated to refer to alternatives only, or unless the alternatives are inherently mutually exclusive. Furthermore, unless explicitly dictated by the language, the term "and" may be interpreted as "or" in some instances. When referencing values, the term "about" may be used to indicate an approximate value, generally one that could be read as being that value plus or minus half of the value. "A" or "an" and the like may mean one or more, unless clearly indicated otherwise. Such "one or more" meanings are most especially intended when references are made in conjunction with open-ended words such as "having," "comprising" or "including." Likewise, "another" object may mean at least a second object or more. Thus, in the context of this specification, the term "comprising" is used in an inclusive sense and thus should be understood as meaning "including, but not limited to." As used herein, the use of "can", "can be", "may", or "may be" indicates that a modified term is appropriate, capable, or suitable for an indicated capacity, function, or usage, while considering that in some circumstances the modified term may sometimes not be appropriate, capable, or suitable. Example quantities and sizing dimensions described herein are not limiting, as other sizes and quantities can also be implemented.

Figure 1:
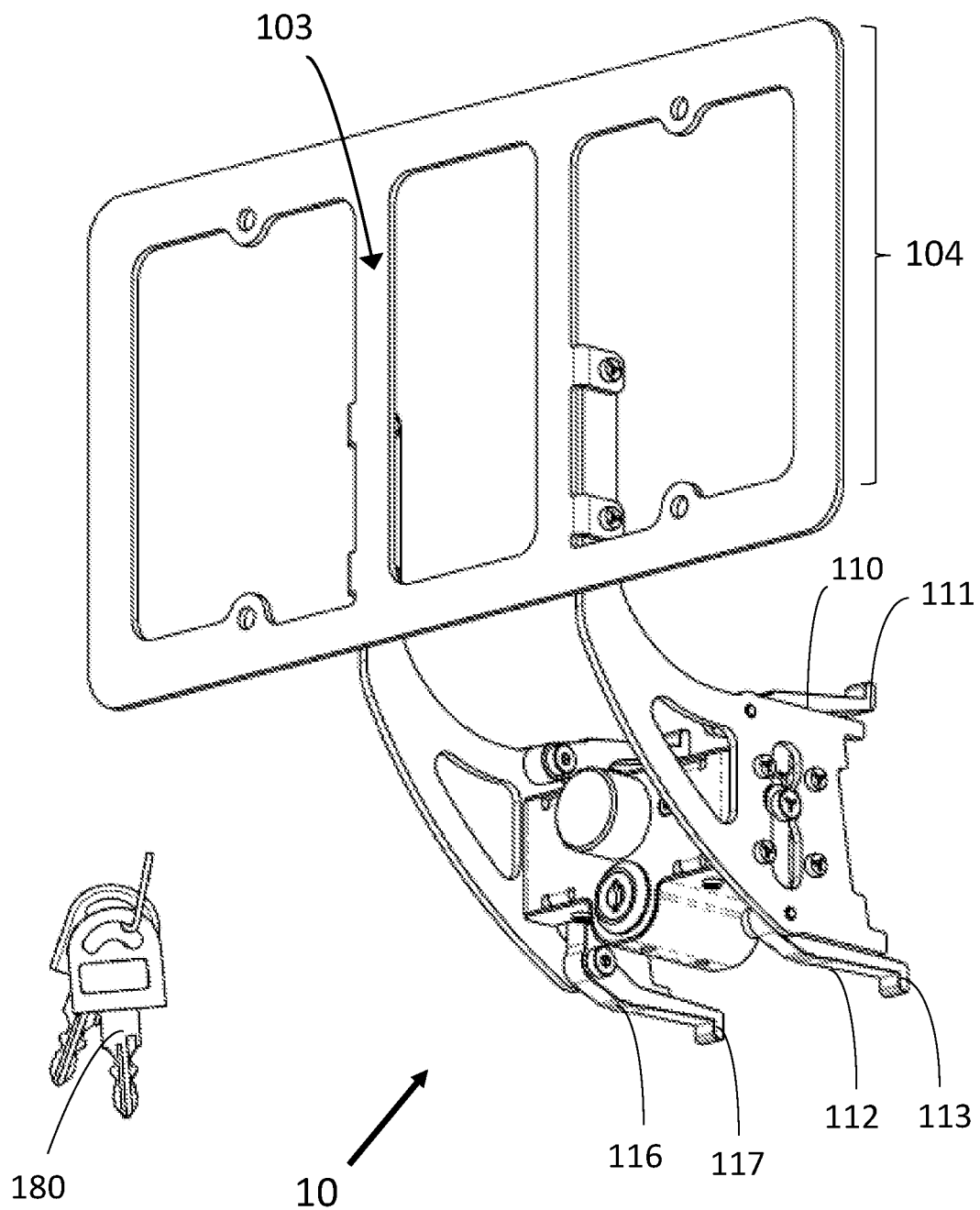
FIG. 1 illustrates a front right perspective view of a display holder device.
Figure 2:
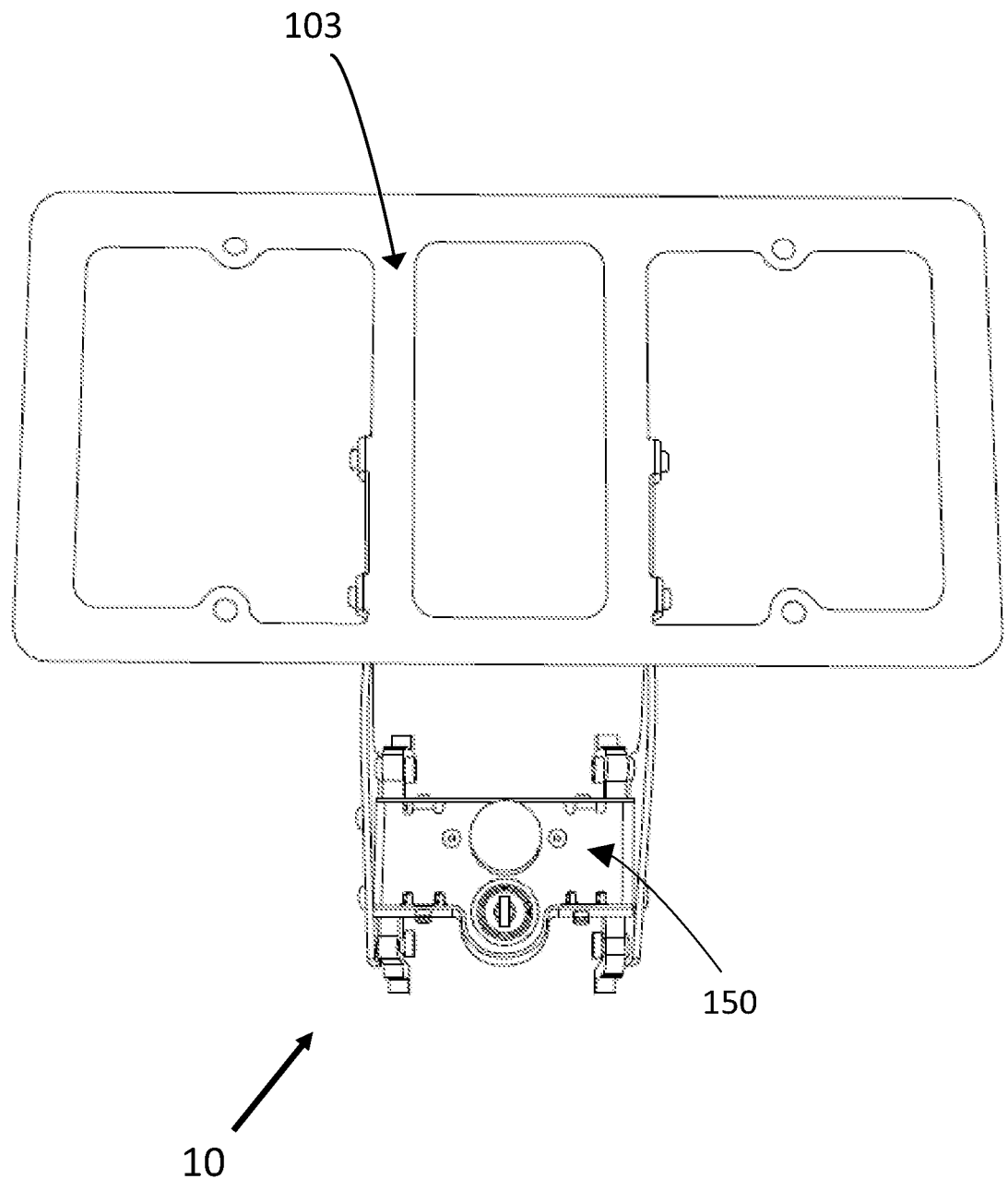
FIG. 2 illustrates a front view of the display holder device.

FIG. 1 illustrates a front right perspective view of a display holder device 10. FIG. 2 illustrates a front view of the display holder device 10. The holder device 10 has many duplicate components on opposite sides, which are viewable in FIGS. 1-4. The "display" 103 includes a display frame 104 which can secure a license plate, and fasteners to secure the plate to the frame 104. The display frame 104 can also secure an image or verbal message in addition to a license plate.

Figure 3:
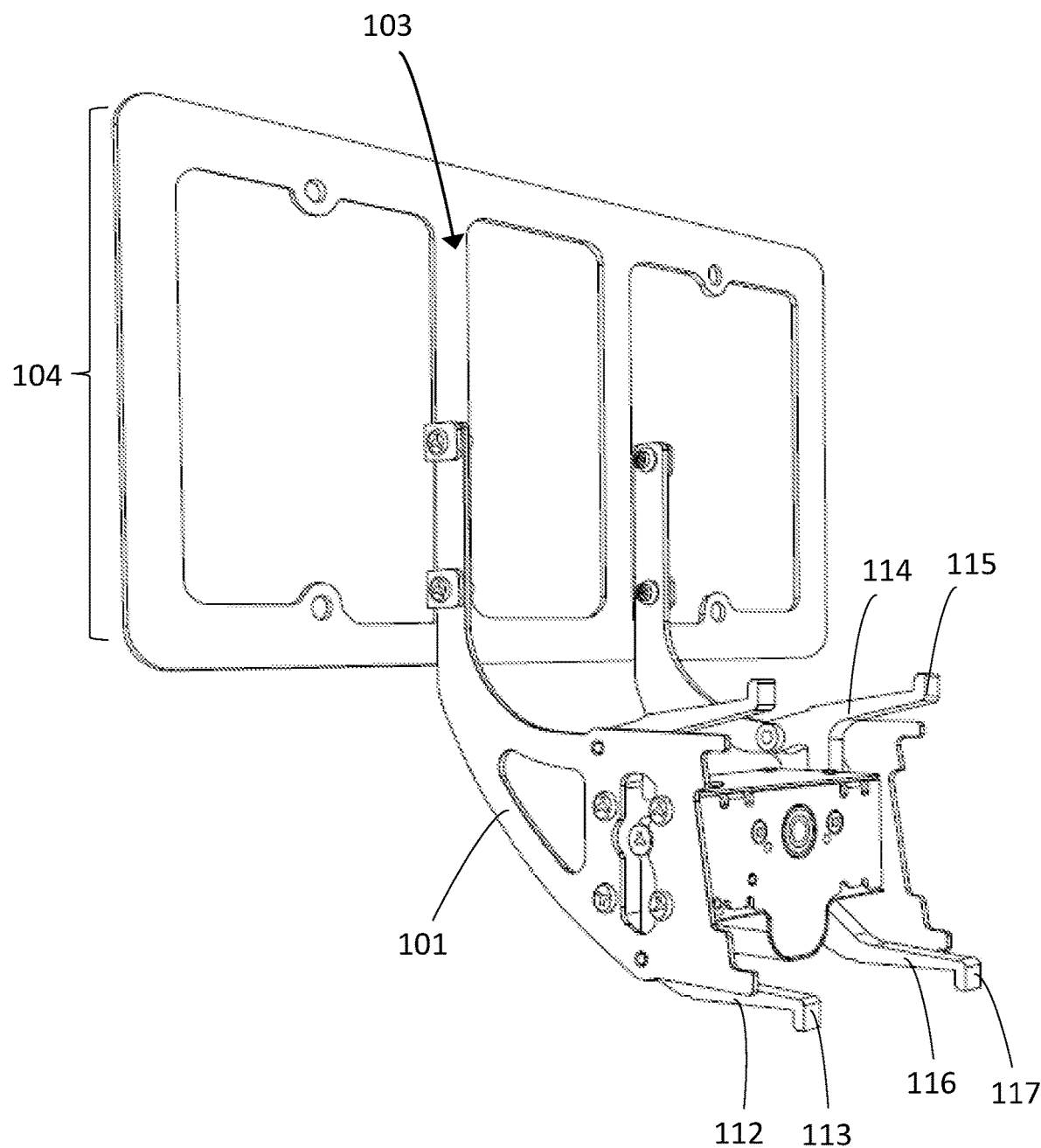
FIG. 3 illustrates a rear right perspective view of the display holder device.
Figure 13:
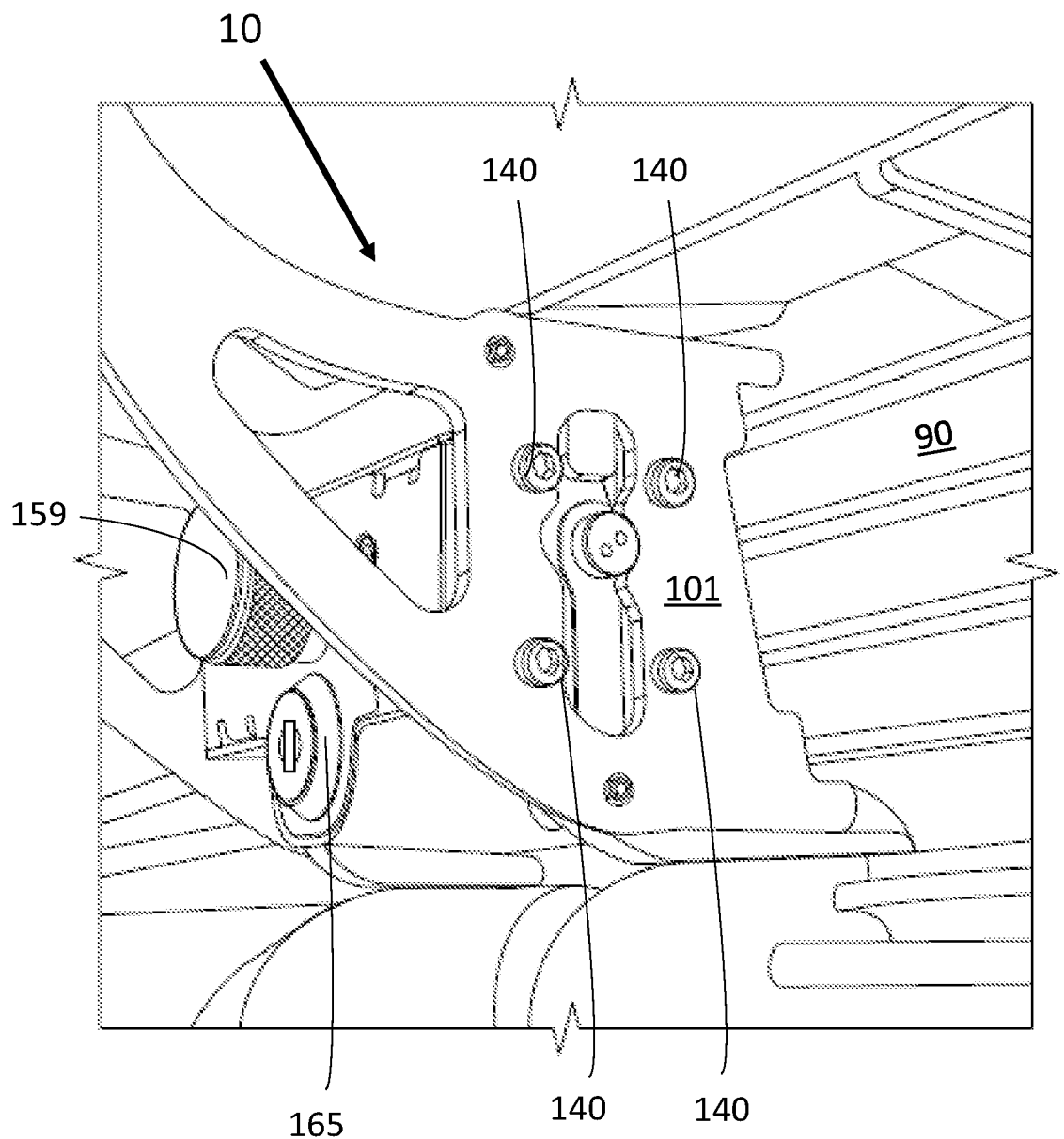
FIG. 13 illustrates a sectional front right perspective view of the holder device mounted to a front grill of a vehicle.

FIG. 3 illustrates a rear right perspective view of the display holder device 10. The device 10 can include a first upper lever 110 and a first lower lever 112. Each of the levers can include a hook at an end of the lever, enabling each lever to engage a portion of the front grill of a vehicle. For example, the first lower lever 112 can include a first lower hook 113 and the second lower lever 116 can include a second lower hook 117. Likewise, the first upper lever 110 can include a first upper hook 111 and the second upper lever 114 can include a second upper hook 115. The first lower hook 113 and the second lower hook 117 are configured to engage a first portion of the front grill of a vehicle, as illustrated in FIG. 13. The first upper hook 111 and the second upper hook 115 are configured to engage a second portion of a front grill of the vehicle.

Figure 4:
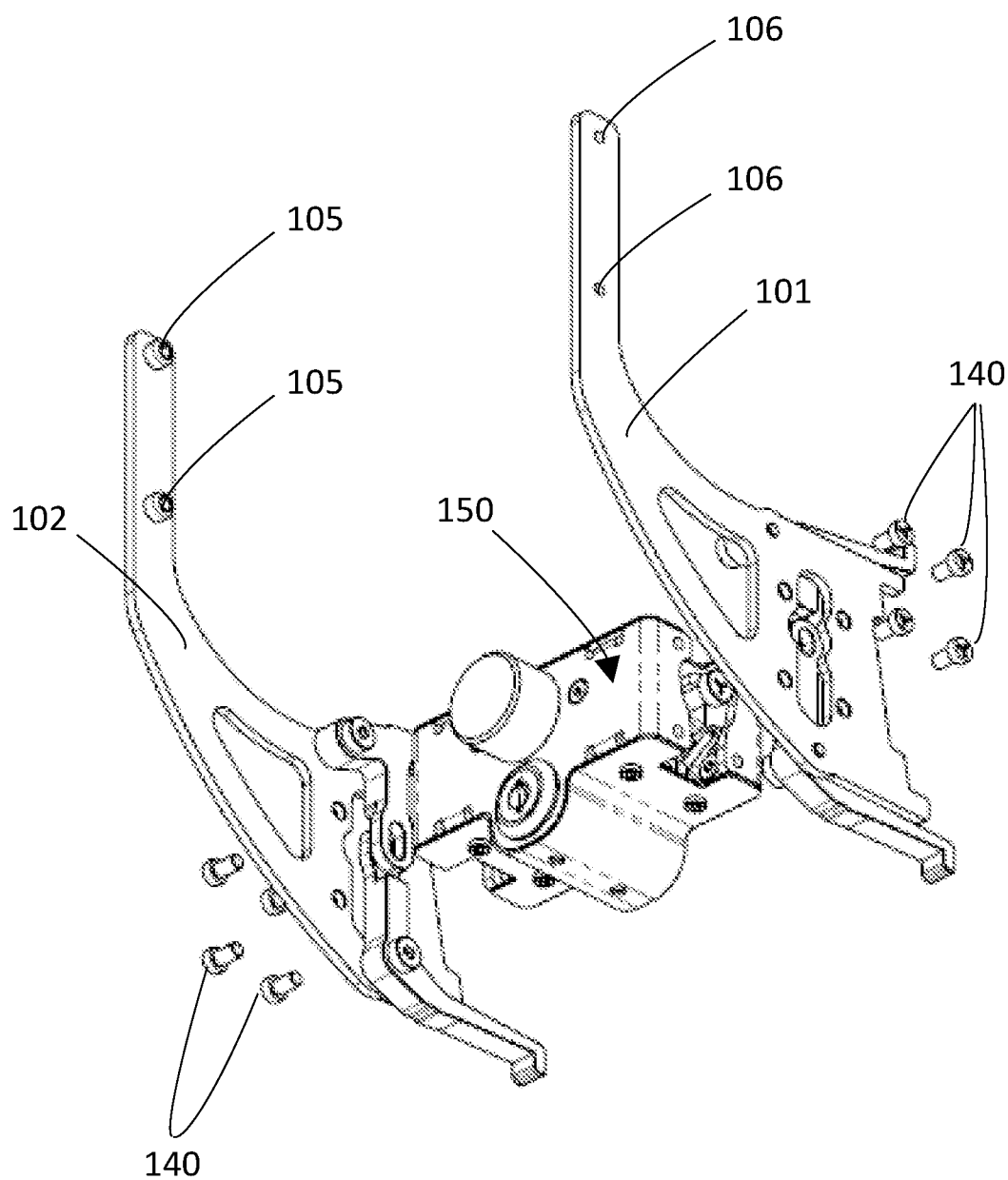
FIG. 4 illustrates a partially exploded perspective view of the display holder device with the display removed.

FIG. 4 illustrates a partially exploded perspective view of the display holder device 10, with the display 103 removed. The device 10 includes a first side panel 101 and a second side panel 102 configured to hold a display 103. The display 103 can be connected to the side panels 101, 102 using one or more fasteners 105 with mounting holes 106, or using other mechanical means such as adhesives. The first upper lever 110 and first lower lever 112 are operatively connected to the first side panel 101 and a linear motion module 150. In a similar structure, the device 10 includes a second upper lever 114 and a second lower lever 116. The second upper lever 114 and second lower lever 116 are operatively connected to the second side panel and the linear motion module 150. Further, the first side panel 101 and second side panel 102 of the device 10 are operatively connected to the linear motion module 150. In this example, four fasteners (e.g. screws) 140 are used to connect the first side panel 101 to the module 150. Similarly, four screws 140 are used to connect the second side panel 102 to the module 150.

Figure 5:
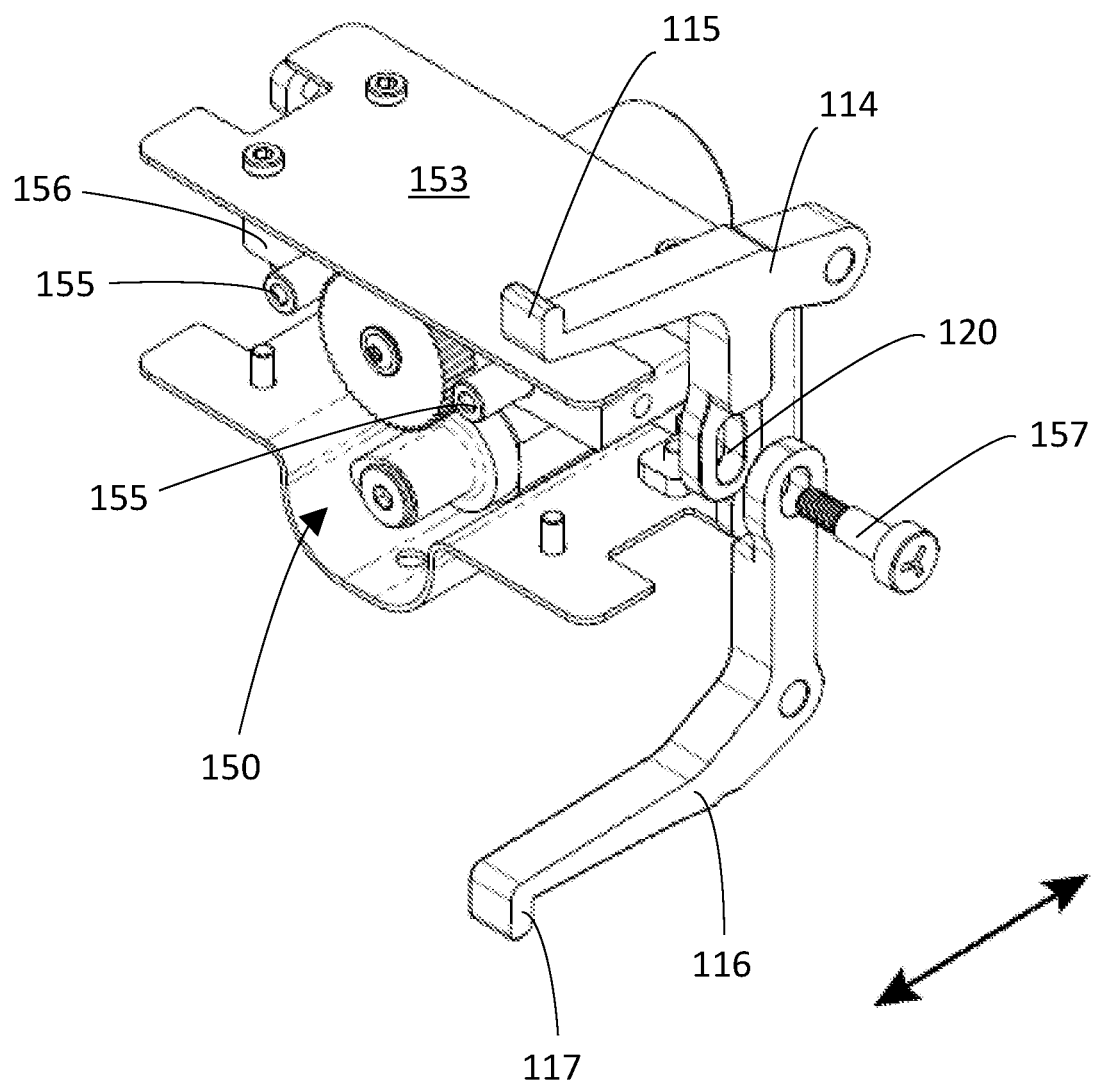
FIG. 5 illustrates a sectional rear perspective view of the holder device, showing the linear motion module with the second upper lever and second lower lever.

FIG. 5 illustrates a sectional rear perspective view of the holder device 10, showing the linear motion module 150 with the second upper lever 114 and second lower lever 116. The back plate 152 is removed in the figure to show the internal components of the module 150. The linear motion module 150 includes a guide shaft 155 and a slider 156 configured to move along the guide shaft 155. The module 150 can include one or more guide shafts. The upper and lower levers each include a slot 120 (opening). The slider 156 includes shoulder bolts 157 attached on each side of the slider 156. The shoulder bolts 157 fit through the lever slots 120 and are fastened to the slider 156. When the slider 156 is moving back and forth, the levers are driven to rotate. Expansion and retraction positions of the levers are illustrated in FIG. 6 and FIG. 7.

Figure 6:
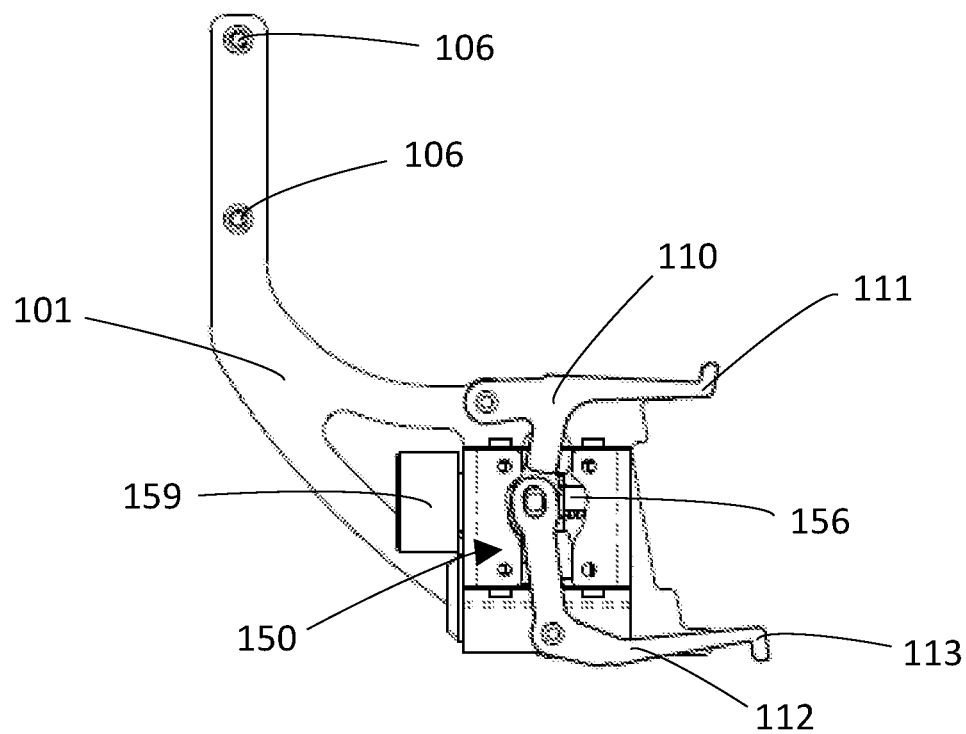
FIG. 6 illustrates a right side view of the holder device in a fully retracted position.

FIG. 6 illustrates a right side view of the holder device 10 in a fully retracted position. As the slider 156 moves backward, the levers retract. The holder device 10 is preferably kept in a retracted position when being stored and not in use. A user can readily move the holder device 10 with retracted levers to a vehicle grill, and place the lower levers 112, 116 on a first portion of the grill.

Figure 7:
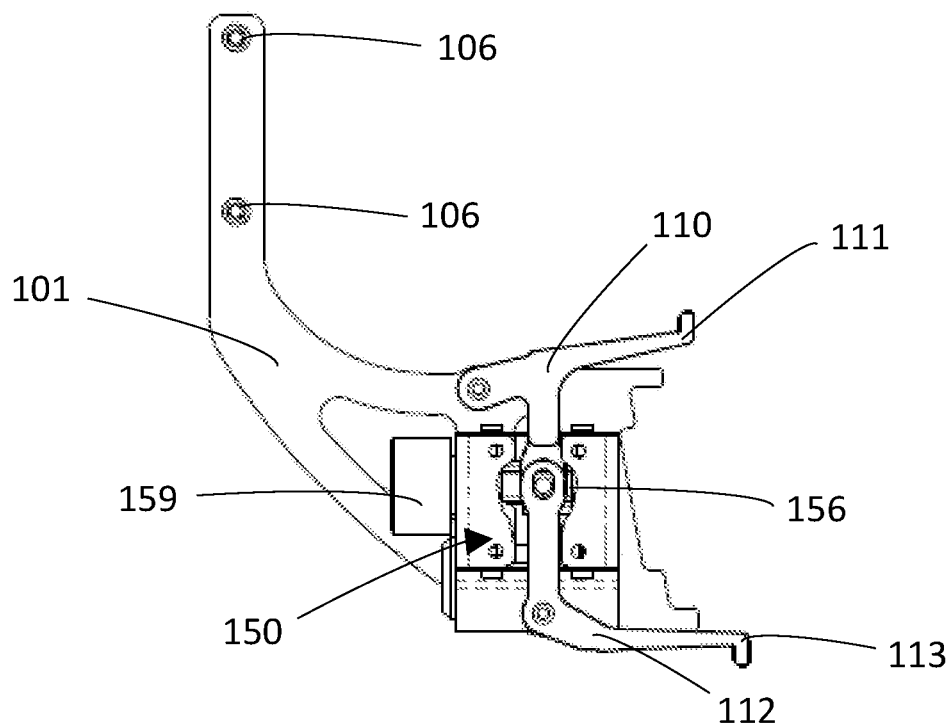
FIG. 7 illustrates a right side view of the holder device in a fully extended (expanded) position.

FIG. 7 illustrates a right side view of the holder device 10 in a fully extended (expanded) position. As the slider 156 moves forward, the levers extend. The upper levers 110, 114 extend upward and the lower levers 112, 116 extend downward. As the levers extend, they can engage portions of a vehicle grill. A user can move the slider 156 forward, causing the levers to extend and press against the grill. Once the levers are extended and pressed against the grill, the holder device 10 can be secured.

Figure 8:
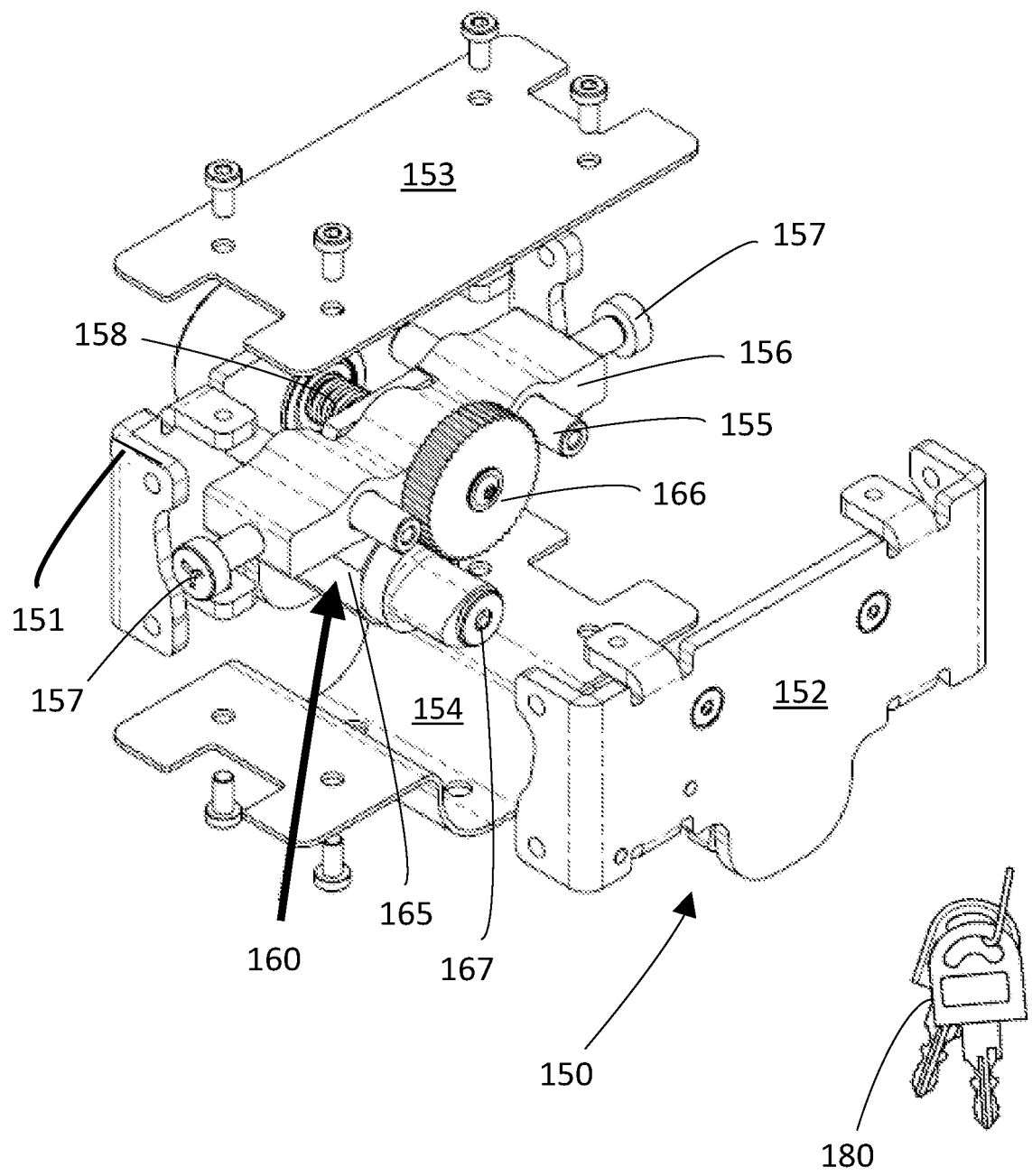
FIG. 8 illustrates a partially exploded perspective view of the linear motion module.

FIG. 8 illustrates a partially exploded perspective view of the linear motion module 150. The linear motion module 150 includes a front plate 151, back plate 152, top plate 153, and bottom plate 154. The plates are shown separated in FIG. 8 to reveal the internal components of the module 150. The module 150 further includes a threaded fastener 158 (e.g. threaded screw, bolt) operatively connected to the slider 156. A locking mechanism 160 includes a lock 165 and ratchet gear 166. The lock 165 is attached to a front plate 151 of the module 150. The locking mechanism includes a cam 167 which is secured onto the end of the lock 165. The cam 167 and lock 165 rotate together when a fitted key 180 is turned. The ratchet gear 166 is attached to the end of the threaded screw 158 and rotates together with the screw 158.

Figure 9:
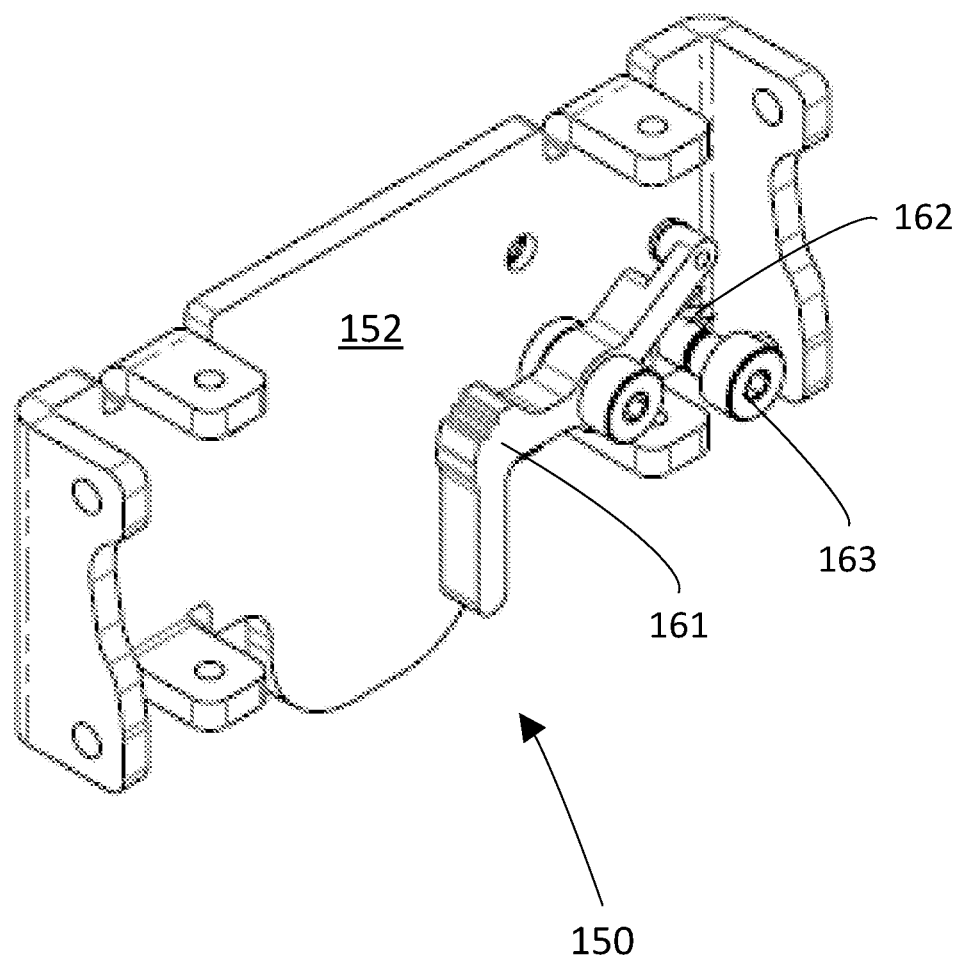
FIG. 9 illustrates a sectional view of the linear motion module, showing part of the locking mechanism.

FIG. 9 illustrates a sectional view of the linear motion module 150, showing part of the locking mechanism. The locking mechanism includes a ratchet paw 161 rotatably attached at a back plate 152 of the module 150. The module 150 also includes a spring 162 with a first end connected to the ratchet paw 161. A second end of the spring 162 is connected to a fastener 163, with the fastener 163 also connected to the back plate 152.

Figure 10:
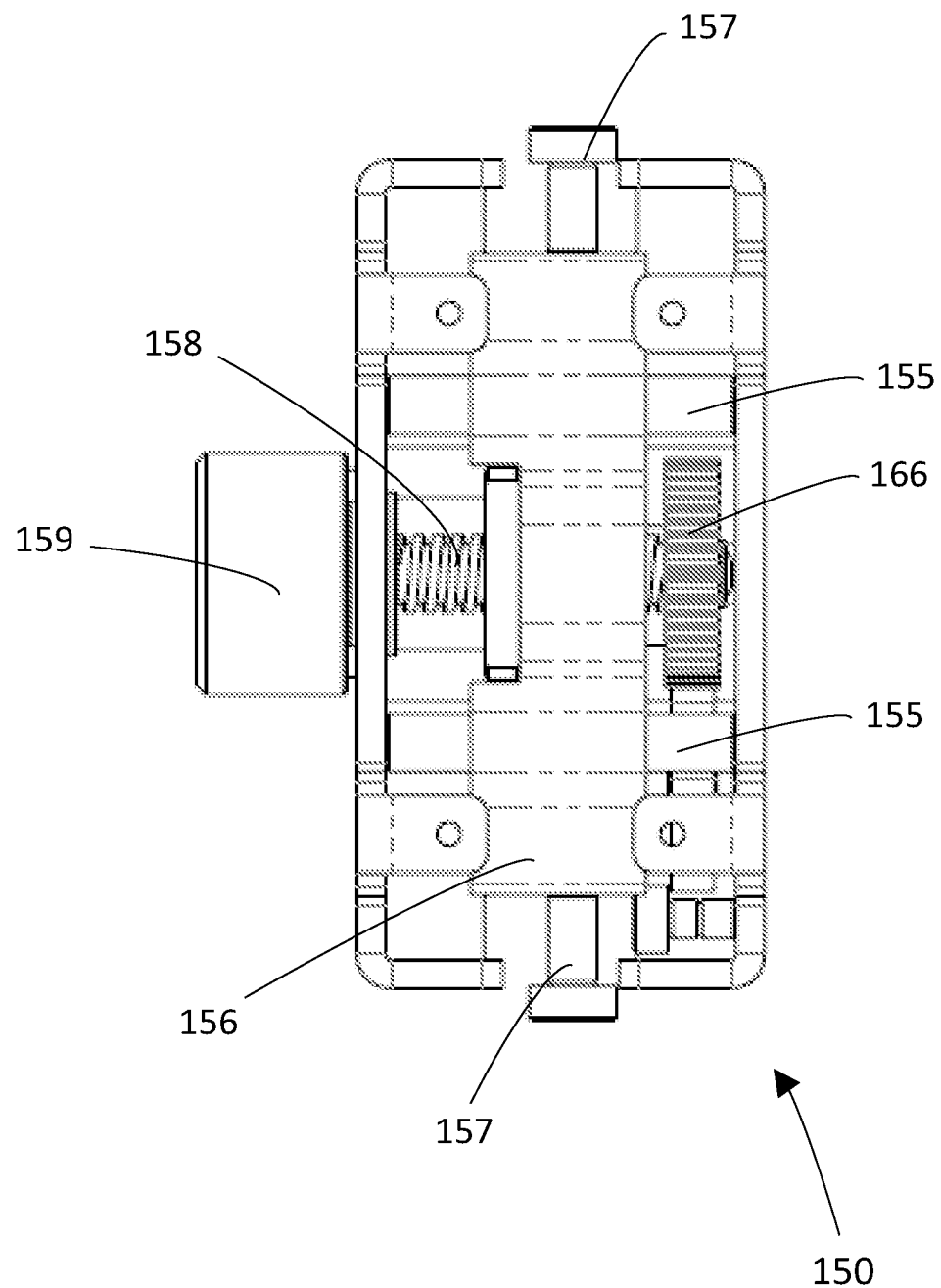
FIG. 10 illustrates the linear motion module with the top plate removed.

FIG. 10 illustrates the linear motion module 150 with the top plate removed. Rotation of the threaded screw 158 enables the slider 156 to move linearly in a forward or backward motion. The module 150 can also include a knob 159 attached to the screw 158. Rotation of the knob 159 also rotates the screw 158 and causes the slider 156 to move in a linear direction.

Figure 11:
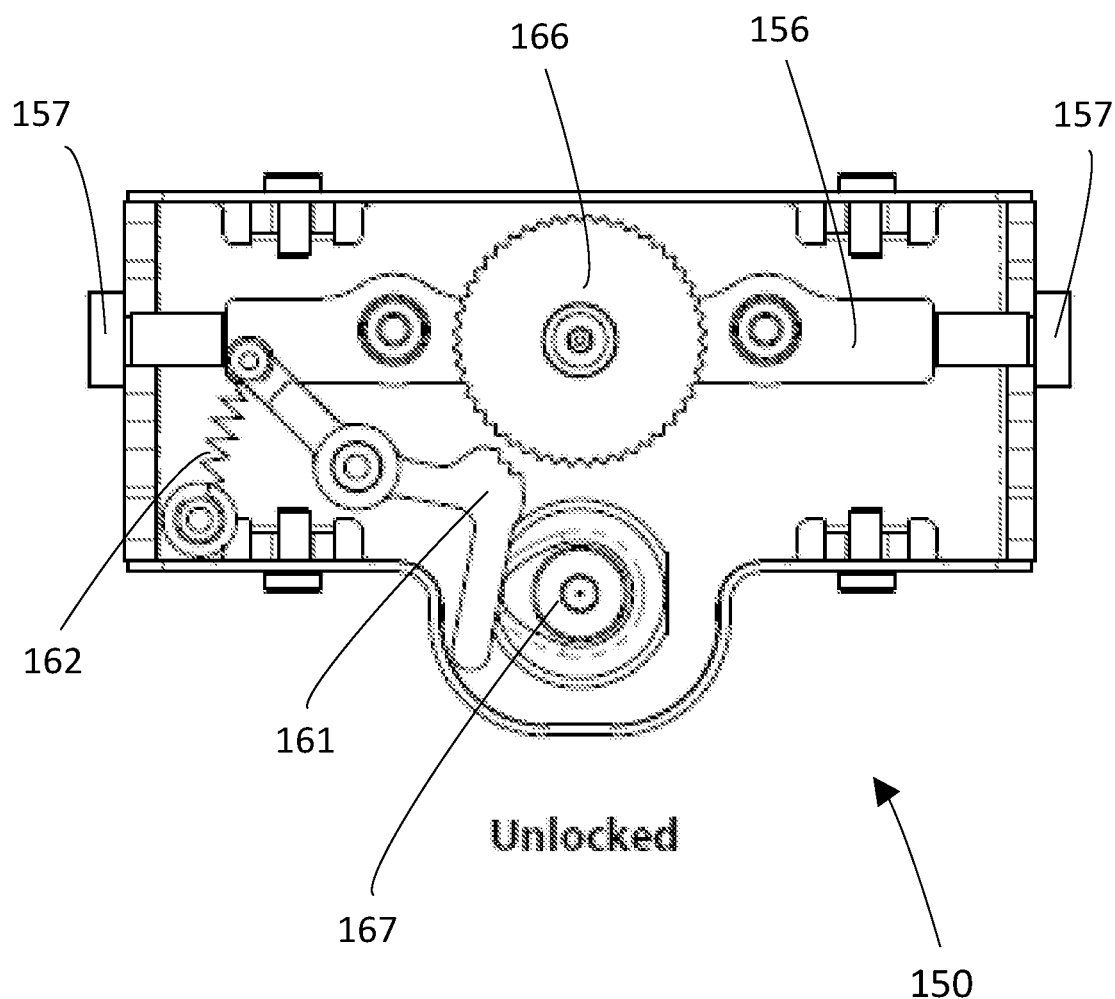
FIG. 11 illustrates a cross-sectional view of the linear motion module in an unlocked position.

FIG. 11 illustrates a cross-sectional view of the linear motion module 150 in an unlocked position. When the key 180 is in the unlocked position, the cam 167 rotates to engage with the ratchet pawl 161 and pushes the ratchet pawl 161 to the side. The pawl 161 disengages from the ratchet gear 166, and the gear 166 is free to spin in either direction. As a result, the threaded screw 158 is free to rotate in both the clockwise and counterclockwise direction, and the slider 158 is free to move both in the forward and backward directions.

Figure 12:
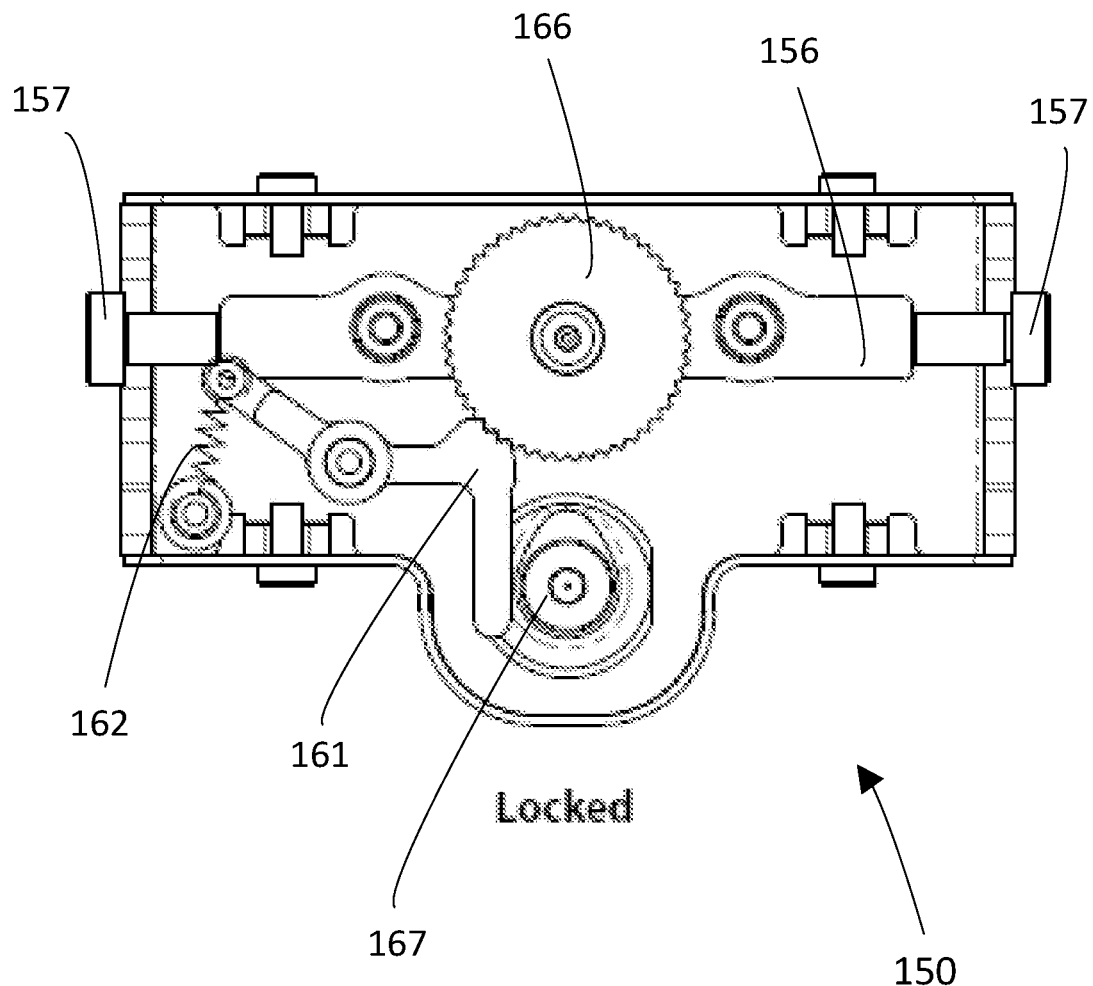
FIG. 12 illustrates a cross-sectional view of the linear motion module in a locked position.

FIG. 12 illustrates a cross-sectional view of the linear motion module 150 in a locked position. When the key 180 is in the locked position, the cam 167 (which rotates with the key) is not touching the ratchet pawl 161. The spring at the end of the ratchet pawl pulls it into the ratchet gear 166, causing them to engage. As a result, the ratchet gear 166 can only turn in one direction. Thus, the threaded screw 158 can only turn in one direction, and the slider 156 can only move in one direction (forward). These components function together to maintain the module 150 in the locked position until a key 180 is used to unlock it. Because the slider 156 cannot move backward, the levers cannot retract, and the license plate holder 10 cannot be removed from a vehicle without a properly fitted key 180.

FIG. 13 illustrates a sectional front right perspective view of the holder device 10 mounted to a front grill 90 of a vehicle. The first lower hook 113 and the second lower hook 117 are engaged with a first portion of the front grill of a vehicle. The first upper hook 111 and the second upper hook 115 are engaged with a second portion of a front grill of the vehicle. When secured, the device 10 stays mounted to the grill 90 when the vehicle is in motion. Further, the device 10 can withstand forces caused by vehicle motion, such as bumps in the road and sudden changes in speed. Four screws are shown projecting from the first side panel 101. The four screws 140 are used to connect the first side panel 101 to the linear motion module 150. There are also four screws on the second side panel 102 (not visible in FIG. 14) for connecting the module 150.

Figure 14:
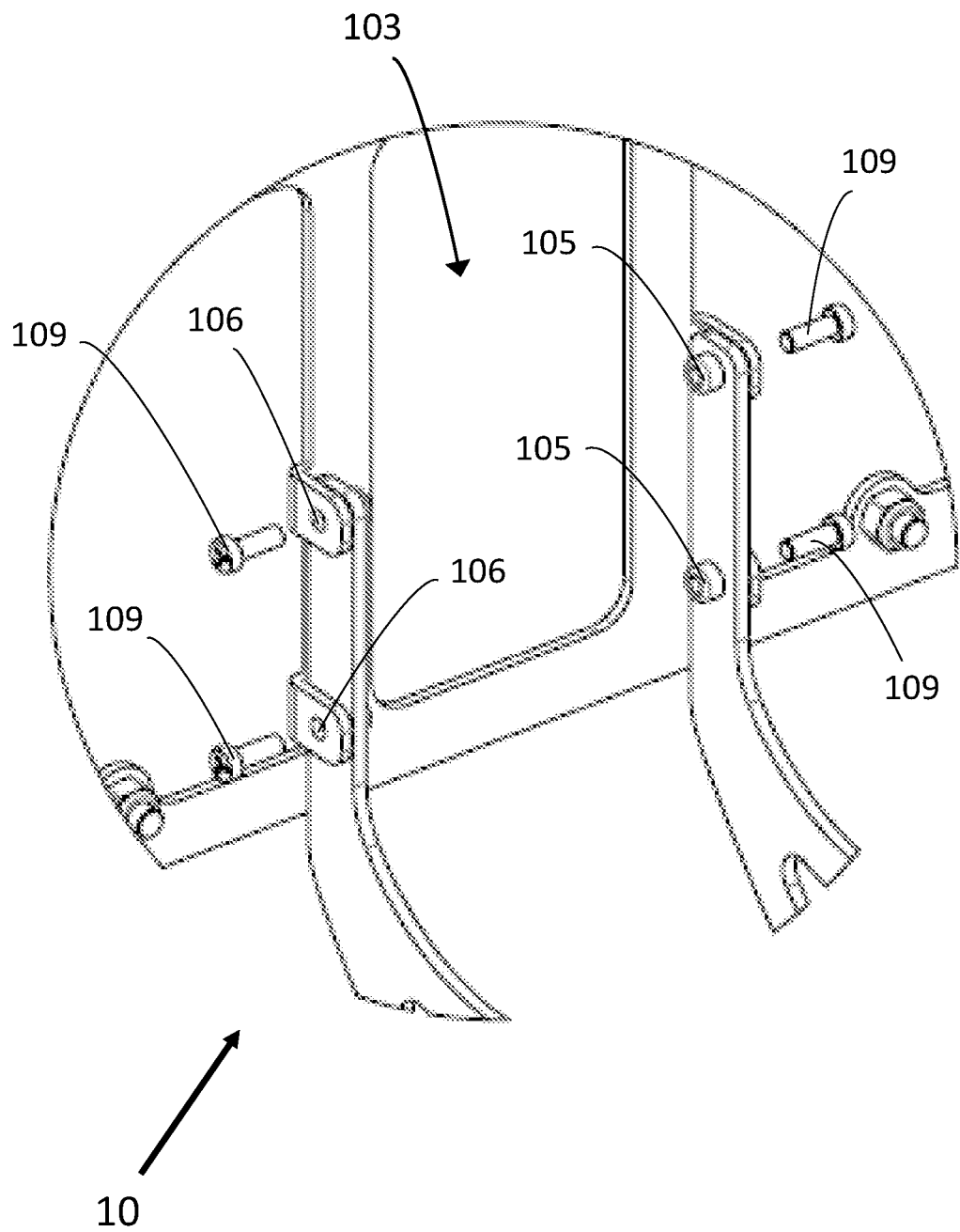
FIG. 14 illustrates a sectional view of the display being connected to the side panels using one or more fasteners with mounting holes.

FIG. 14 illustrates a sectional view of the display 103 being connected to the side panels 101, 102 using one or more fasteners 105 with mounting holes 106. In this example, two screws 109 are used to connect the first side panel 101 to the display 103. Two screws 109 are used to connect the second side panel 102 to the display 103. Other mechanical means such as adhesives, bolts, pins, etc. can be used to secure the display 103 to the side panels 101, 102.

Figure 15:
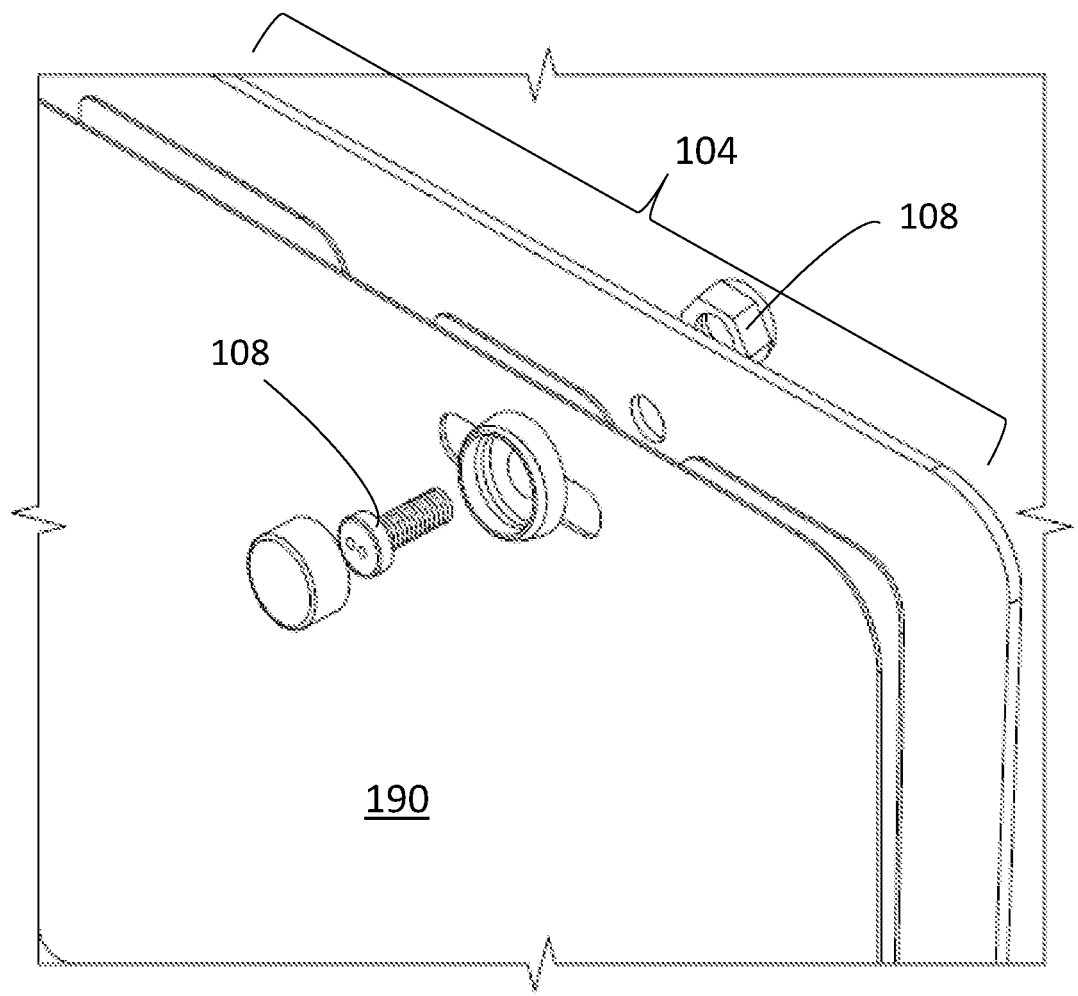
FIG. 15 illustrates a sectional view of a license plate being secured to the display frame.

FIG. 15 illustrates a sectional view of a license plate 190 being secured to the display frame 104. The license plate, image, or verbal message can be placed inside the display frame 104 and secured using one or more fasteners 108 which are received by mounting holes. In this illustrated example, the fasteners 108 include a threaded bolt and a threaded nut. Other mechanical means such as adhesives, screws, pins, etc. can be used to secure a license plate 190, or other display images and messages.

The invention claimed is:

1. A device for securing a display to a vehicle, the device comprising:
   a) a first side panel and a second side panel configured to hold the display;
   b) a linear motion module comprising:
      i) one or more guide shafts;
      ii) a slider configured to move along the one or more guide shafts;
      iii) a threaded fastener operatively connected to the slider;
      iv) wherein rotation of the threaded fastener causes the slider to move in a linear direction;
   c) a first upper lever and a first lower lever;
   d) the first upper lever includes a hook and the first lower lever includes a hook;
   e) wherein the first upper lever and the first lower lever are operatively connected to the first side panel;
   f) wherein the first upper lever and the first lower lever are operatively connected to the linear motion module;
   g) a second upper lever and a second lower lever;
   h) the second upper lever includes a hook and the second lower lever includes a hook;
   i) wherein the second upper lever and the second lower lever are operatively connected to the second side panel;
   j) wherein the second upper lever and the second lower lever are operatively connected to the linear motion module;
   k) wherein the hook of the first upper lever and the hook of the second upper lever are configured to engage a first portion of a front grill of the vehicle; and
   l) wherein the hook of the first lower lever and the hook of the second lower lever are configured to engage a second portion of the front grill of the vehicle.

2. The device of claim 1, further comprising a locking mechanism to limit the direction of motion of each of the first upper lever, the second upper lever, the first lower lever, and the second lower lever.

3. The device of claim 2, wherein the locking mechanism includes a key lock and a ratchet.

4. The device of claim 1, further comprising:
   a) wherein movement of the slider in a first direction causes the first upper lever, the second upper lever, the first lower lever, and the second lower lever to expand; and
   b) wherein movement of the slider in a second direction causes the first upper lever, the second upper lever, the first lower lever, and the second lower lever to retract.

5. A device for securing a display to a vehicle, the device comprising:
   a) a first side panel and a second side panel configured to hold a display;
   b) a linear motion module comprising:
      i) one or more guide shafts;
      ii) a slider configured to move along the one or more guide shafts;
      iii) a threaded fastener operatively connected to the slider;
      iv) a knob attached to the threaded fastener;
      v) wherein rotation of the knob causes the slider to move in a linear direction;
   c) a first upper lever and a first lower lever;
   d) the first upper lever includes a hook and the first lower lever includes a hook;
   e) wherein the first upper lever and the first lower lever are operatively connected to the first side panel;
   f) wherein the first upper lever and the first lower lever are operatively connected to the linear motion module;
   g) a second upper lever and a second lower lever;
   h) the second upper lever includes a hook and the second lower lever includes a hook;
   i) wherein the second upper lever and the second lower lever are operatively connected to the second side panel;
   j) wherein the second upper lever and the second lower lever are operatively connected to the linear motion module;
   k) wherein the hook of the first upper lever and the hook of the second upper lever are configured to engage a first portion of a front grill of the vehicle;
   l) wherein the hook of the first lower lever and the hook of the second lower lever are configured to engage a second portion of the front grill of the vehicle; and
   m) a locking mechanism to limit a direction of motion of each of the first upper lever, the second upper lever, the first lower lever, and the second lower lever.

6. The device of claim 5, wherein the locking mechanism includes a key lock and a ratchet.

7. The device of claim 5, further comprising:
   a) wherein movement of the slider in a first direction causes the first upper lever, the second upper lever, the first lower lever, and the second lower lever to expand; and b) wherein movement of the slider in a second direction causes the first upper lever, the second upper lever, the first lower lever, and the second lower lever to retract.

8. A method of securing a display to a vehicle, the method comprising:
- a) providing a first side panel and a second side panel configured to hold the display;
- b) providing a linear motion module, the linear motion module comprising:
  - i) one or more guide shafts;
  - ii) a slider configured to move along the one or more guide shafts;
  - iii) a threaded fastener operatively connected to the slider;
  - iv) wherein rotation of the threaded fastener causes the slider to move in a linear direction;
- c) providing a first upper lever and a first lower lever:
  - i) wherein the first upper lever includes a hook and the first lower lever includes a hook;
  - ii) wherein the first upper lever and the first lower lever are operatively connected to the first side panel;
  - iii) wherein the first upper lever and the first lower lever are operatively connected to the linear motion module;
- d) providing a second upper lever and a second lower lever:
  - i) wherein the second upper lever includes a hook and the second lower lever includes a hook;
  - ii) wherein the second upper lever and the second lower lever are operatively connected to the second side panel;
  - iii) wherein the second upper lever and the second lower lever are operatively connected to the linear motion module;
- e) positioning the hook of the first lower lever and the hook of the second lower lever on a first portion of a front grill of the vehicle; and
- f) rotating the threaded fastener to enable the hook of the first upper lever and the hook of the second upper lever to engage a second portion of the front grill of the vehicle.

9. The method of claim 8, further comprising:
- a) moving the slider in a first direction to expand the first upper lever, the second upper lever, the first lower lever, and the second lower lever; and
- b) moving the slider in a second direction retracts the first upper lever, the second upper lever, the first lower lever, and the second lower lever.

10. The method of claim 8, further comprising:
- a) limiting a direction of motion of each of the first upper lever, the second upper lever, the first lower lever, and the second lower lever with a locking mechanism.

11. The method of claim 10, wherein the locking mechanism includes a key lock and a ratchet.

\* \* \* \* \*